J. H. GENTER.
AUTOMATIC ANNUNCIATOR.
APPLICATION FILED MAY 14, 1913.
1,147,501.
Patented July 20, 1915.
2 SHEETS—SHEET 1.
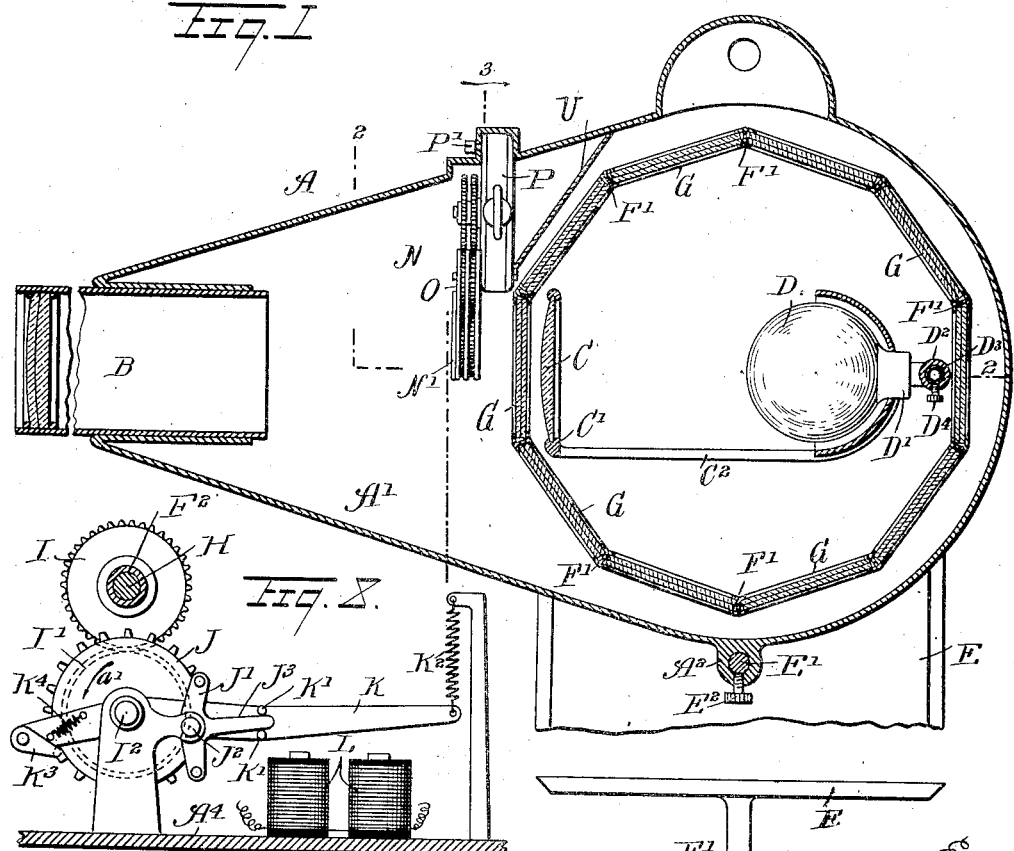
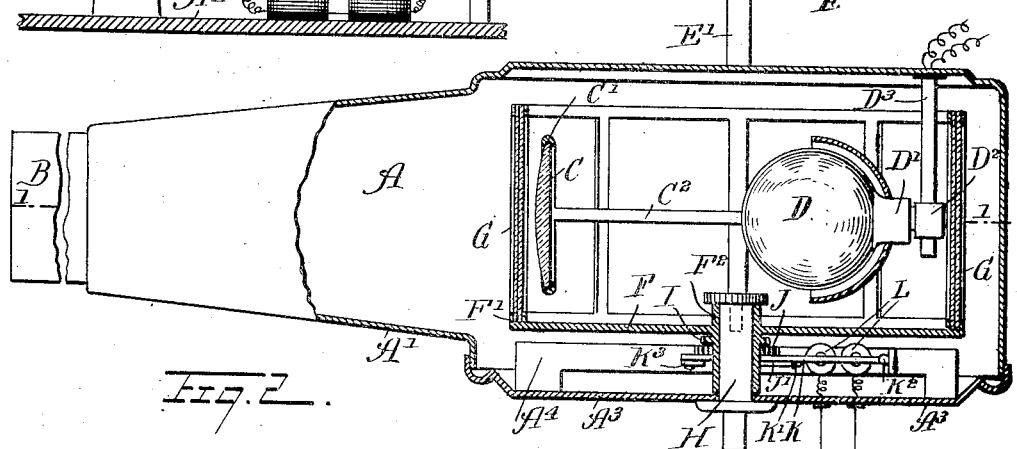
WITNESSES
H. J. Walker
INVENTOR
Jacob H. Genter
BY
ATTORNEYS

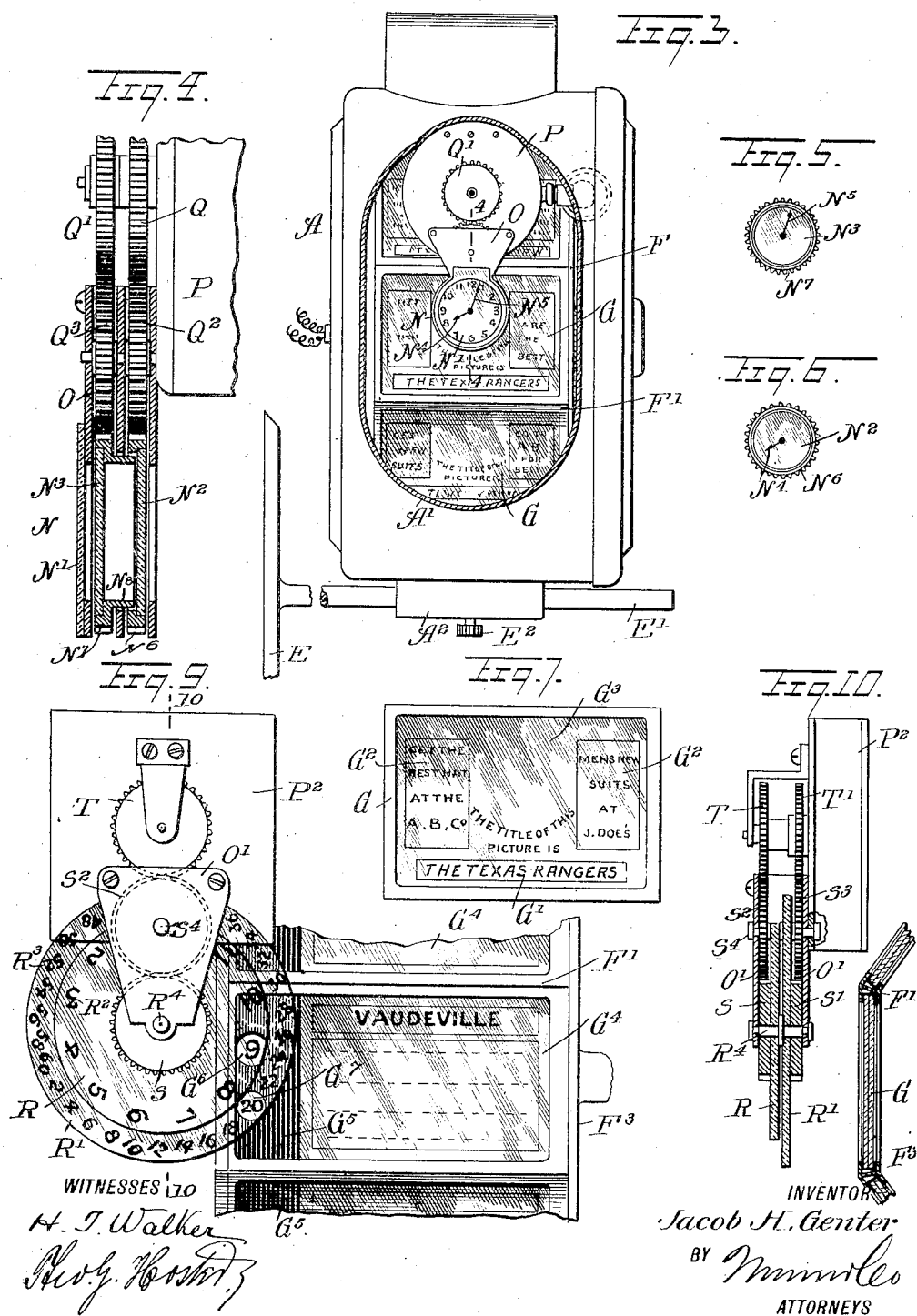

UNITED STATES PATENT OFFICE.

JACOB H. GENTER, OF NEWBURGH, NEW YORK.

AUTOMATIC ANNUNCIATOR.

1,147,501.   Specification of Letters Patent.   Patented July 20, 1915.

Application filed May 14, 1913. Serial No. 767,563.

*To all whom it may concern:*

Be it known that I, JACOB H. GENTER, a citizen of the United States, and a resident of Newburgh, in the county of Orange and State of New York, have invented a new and Improved Automatic Annunciator, of which the following is a full, clear, and exact description.

The invention relates to projecting apparatus for projecting pictures and other subject matter onto a distant screen, wall, sidewalk or other surface.

The object of the invention is to provide a new and improved annunciator arranged to display the time of the day or night on a distant surface together with any desired legend or other subject matter, such as advertisements, titles of vaudeville acts or of moving pictures, etc.

In order to accomplish the desired result use is made of a projecting apparatus provided with a revoluble slide carrier on which a series of slides are mounted, and of which slides each is adapted to pass into the field of the apparatus on intermittently rotating the slide carrier, and a time-indicating device arranged in the field of the apparatus and wholly independent of the slide carrier and its slides so that both the subject matter of a slide and the time-indicating device are simultaneously projected onto a distant surface.

A practical embodiment of the invention is represented in the accompanying drawings forming a part of this specification, in which similar characters of reference indicate corresponding parts in all the views.

Figure 1 is a sectional side elevation of the annunciator on the line 1—1 of Fig. 2; Fig. 2 is a sectional plan view of the same on the line 2—2 of Fig. 1; Fig. 3 is a cross section of the same on the line 3—3 of Fig. 1; Fig. 4 is an enlarged sectional side elevation of the time-indicating device; Fig. 5 is a face view of the minute hand disk; Fig. 6 is a similar view of the hour hand disk; Fig. 7 is a face view of one of the slides; Fig. 8 is an enlarged side elevation of the actuating mechanism for the slide carrier, parts being in section; Fig. 9 is an enlarged face view of a modified form of the time-indicating device; and Fig. 10 is a sectional side elevation of the same on the line 10—10 of Fig. 9 and shown in connection with the slide carrier.

In carrying out the invention use is made of a projecting apparatus A having a casing A' in which is mounted an objective B, a condenser lens C and a source of light D in the rear of the condenser lens, as indicated in Figs. 1 and 2. The casing A' is removably held on a bracket E attached to a wall, post or other suitable support and having a rod E' passing through an apertured boss $A^2$ held in the bottom of the casing A'. The boss $A^2$ is provided with a set screw $E^2$ adapted to engage the rod E' so as to securely fasten the casing A' on the rod E' of the bracket E.

Within the casing A' of the projecting apparatus A is mounted to rotate intermittently a slide carrier F, preferably in the form of a skeleton wheel provided at its peripheral face with guideways F' for the reception of removable slides G containing the subject matter to be projected by the projecting apparatus onto a distant screen, wall, sidewalk or other surface. By reference to Figs. 1 and 2 it will be noticed that the condenser lens C and the source of light D are arranged within the slide carrier F in such a manner that the slides G move successively into the field of the projecting apparatus, that is, between the condenser lens C and the objective B.

The slide carrier F is rotated intermittently at the option of the operator in charge so as to permit of displaying the subject matter of the slide G, in active position at the time, any desired length of time, and for this purpose the following arrangement is made: The slide carrier F is provided with a hub $F^2$ mounted to rotate loosely on a shaft H attached to the door or cover $A^3$ on one side of the casing A', and on the said hub $F^2$ is secured a gear wheel I (see Figs. 2 and 8) in mesh with a gear wheel I' secured on a transversely-extending shaft $I^2$ journaled in suitable bearings arranged on a bracket $A^4$ attached to or forming part of the door $A^3$. On the shaft $I^2$ is secured a toothed wheel J engaged by an escapement lever J' fulcrumed at $J^2$ on the bracket $A^4$. The escapement lever J' is provided with an arm $J^3$ extending between two pins K' held on an armature lever K fulcrumed loosely on the shaft $I^2$. The armature lever K is adapted to be swung downward by the action of a pair of electro-magnets L when the latter are energized, and a spring $K^2$ connected with the free end of the armature lever K serves to swing the armature lever K upward whenever the electromagnets L are deënergized. The electromagnets L are in an electric circuit L' provided with a battery or other source of electrical energy $L^2$ and with a switch $L^3$ under the control of an operator at any desired distant point. When the switch $L^3$ is closed the electro-magnets L are energized to swing the lever K downward, and when the switch is opened the electro-magnets L are deënergized to allow the spring $K^2$ to swing the armature lever K upward. On the armature lever K is fulcrumed a pawl $K^3$ adapted to engage the teeth of the wheel J, and the said pawl $K^3$ is pressed on by a spring $K^4$ attached to the lever K to hold the pawl in engagement with the wheel J. Now when the armature lever K is swung downward the pawl $K^3$ glides over the teeth of the wheel J and at the same time the armature lever K actuates the escapement lever J' by the pin K' so as to release the wheel J, and when the lever K swings upward the pawl $K^3$ turns the wheel J until the escapement lever J' again locks the wheel J against further rotation. It will be noticed that when the wheel J is rotated in the direction of the arrow $a'$ then a rotary motion is given by the gear wheels I and I' to the slide carrier F so that the next following slide G is moved into the field of the projecting apparatus. It is understood that the switch $L^3$ is opened and closed as often as is necessary for turning the slide carrier F sufficiently far to move the next following slide G, or any other slide, into the field of the projecting apparatus.

The projecting apparatus so far described is the same, practically, as that disclosed in my Patents No. 1,097,310, granted May 19, 1914, and No. 1,101,429, granted June 23, 1914.

A time-indicating device N extends into the field of the projecting apparatus A in front of the slide G in active position at the time, and this time-indicating device is so arranged that the correct time of the day or night is projected onto the distant surface together with the subject matter of the active slide G. The time-indicating device N consists essentially of a dial N', an hour disk $N^2$ and a minute disk $N^3$ the disks being made of glass, mica or other suitable transparent material. The dial N' is attached to a framework O secured to and depending from the casing of a timepiece P, such as a clock or watch of any approved construction, removably mounted within the casing A' by a set screw P', as plainly indicated in Fig. 1. The dial N' is provided with the usual graduation and numerals indicating hours and minutes, similar to those of any clock or watch (see Fig. 3), and the disk $N^2$ is provided with a fixed hour hand $N^4$, while the disk $N^3$ is provided with a fixed minute hand $N^5$, the said hands $N^4$ and $N^5$ being adapted to indicate on the graduation and numerals of the dial N' on rotating the said disks $N^2$, $N^3$ so as to indicate the correct time. The disks $N^2$ and $N^3$ are driven from the timepiece P and for this purpose the hour and minute arbors of the time-piece are provided with gear wheels Q, Q' (see Fig. 4) in mesh with intermediate gear wheels $Q^2$, $Q^3$ journaled on the frame O and in mesh with gear wheels $N^6$, $N^7$ carrying the transparent disks $N^2$, $N^3$. The wheel $N^7$ is provided with a hub $N^8$ mounted to turn in the frame O, and the wheel $N^6$ is mounted to turn loosely on the hub $N^8$. Now it will be noticed that by the arrangement described the timepiece P rotates the disks $N^2$, $N^3$ so that their hands $N^4$, $N^5$ indicate the correct time on the graduation and numerals of the dial N', and as the said disks $N^2$, $N^3$ and the dial N' are in the field of the projecting apparatus, it is evident that the hands and the graduation and numerals are displayed on a distant surface to indicate the correct time of the day or night.

Each of the slides G is provided with a legend G' for indicating the title of a vaudeville act or that of a moving picture or the like, and the slide G is also provided, preferably at the sides, with panels $G^2$ for containing subject matter such as advertisements, pictures and the like, and the space $G^3$ between the panels $G^2$ is in alinement with the time-indicating device, that is, with the dial N' and the disks $N^2$, $N^3$ so that the time appears on the distant surface at the middle of the screen. It is understood that I do not limit myself to the special arrangement of the slide G as described, as the same may be varied to suit existing conditions.

In the modified form shown in Figs. 9 and 10, use is made of two concentric disks R and R' of transparent material, and of which the disk R is provided on its face with numerals $R^2$ indicating the hours of the day or night, and on the disk R' are arranged the numerals $R^3$ from 2 to 60, indicating minutes. The hour and minute disks R and R' are mounted to rotate loosely on a shaft $R^4$ held on a frame O' attached to a timepiece $P^2$ fastened in the casing A', the same as the timepiece P previously mentioned. On the hour and minute disks R and R' are secured gear wheels S, S' in mesh with intermediate gear wheels $S^2$, $S^3$ mounted to rotate loosely on studs $S^4$ carried by the frame O', and gear wheels T, T' mesh with the said intermediate gear wheels $S^2$, $S^3$.

The gear wheels T and T' are mounted on the hour and minute arbors of the timepiece $P^2$ so that the hour and minute disks R and R' are rotated in such a manner that the disk R makes one complete revolution every twelve hours while the disk R' makes one complete revolution every hour.

The slides G⁴ are similar to the slides G and are mounted on a slide carrier F³ the same as above described in reference to Figs. 1, 2 and 3, and each slide G⁴ is provided at one side with an opaque portion G⁵ provided with openings G⁶, G⁷ with which are adapted to register the hour numerals R² and the minute numerals R³ of the hour and minute disks R and R'.

The timepiece P² is preferably of the intermittent type so that the hour disk R is turned only at the end of an hour to move the next numeral R² suddenly into register with the opening G⁶. The minute disk R' is turned at the end of every two minutes to suddenly move the next numeral R³ into register with the opening G⁷.

It will be noticed that the disks R and R' extend over the opaque portion G⁵ and their numerals move into register with the openings G⁶, G⁷ to be projected onto the distant screen, thus indicating the time, for instance, as shown in Fig. 9, the time displayed being twenty minutes past nine.

Within the casing A' (see Fig. 1) is arranged a shield U extending between the peripheral face of the slide carrier F and the timepiece P to protect the latter against the heat emanating from the source of light.

Having thus described my invention, I claim as new and desire to secure by Letters Patent:

1. The combination with a casing, and a projecting apparatus therein, of a time piece removably secured to the casing to project therefrom adjacent to and in front of the slide carrier, said time piece having an apertured frame projecting in the path of light, a dial secured to the frame over the aperture thereof, a gear having a hub mounted to turn in the frame in rear of the dial and carrying a transparent disk provided with a fixed minute hand, a second gear wheel mounted to turn on the hub of the first gear wheel and carrying a transparent disk provided with a fixed hour hand, and means for operating the said gear wheels from the hour and minute arbors of the time piece.

2. The combination with a casing, and a projecting apparatus therein, of a time piece having an apertured frame projecting from the casing of the time piece, means for removably securing the time piece to the casing of the projecting apparatus adjacent to and in front of the slide carrier to hold it projecting therefrom with its apertured frame in the path of light, a dial secured to the frame over the aperture thereof, a gear wheel having a hub mounted to turn in the frame in the rear of the dial and carrying a transparent disk having a fixed minute hand, a gear wheel mounted on the hub of the first gear wheel and carrying a transparent disk having a fixed hour hand, gear wheels mounted in the frame and meshing with the disk carrying gear wheels and geared with the hour and minute arbors of the time piece.

3. A time indicating device for a projecting apparatus consisting of a time piece having an apertured frame projecting from the casing thereof and provided with gear wheels on its hour and minute arbors outside of its casing, said time piece being adapted to be secured to the casing of the projecting apparatus adjacent to and in front of the slide carrier to hold it projecting therefrom with its aperture frame in the path of light, a dial on the frame over the aperture thereof, a gear wheel having a hub mounted to turn in the frame and carrying a transparent disk provided with a fixed minute hand, a gear wheel mounted on the hub of the first gear wheel and carrying a transparent disk provided with a fixed hour hand, gear wheels mounted in the said frame and meshing with the gear wheels on the hour and minute arbors of the time piece and with the disk carrying gear wheels.

4. In a projecting apparatus of the character described, a wheel-like slide carrier having the slides on its periphery, a shaft geared with the slide carrier, a toothed wheel on said shaft, an escapement lever engaging the said wheel, an electro-magnet, a pivoted and spring pressed armature lever provided with spaced projections between which the escapement lever projects, and a pivoted and spring pressed pawl carried by the armature lever and engaging the toothed wheel.

In testimony whereof I have signed my name to this specification in the presence of two subscribing witnesses.

JACOB H. GENTER.

Witnesses:
EDITH I. SMITH,
FLORENCE S. WALLACE.